United States Patent
Martin et al.

(10) Patent No.: US 12,248,688 B2
(45) Date of Patent: Mar. 11, 2025

(54) STORAGE SYSTEM RECONFIGURATION ALTERNATION FOR PROCESSING INTENSIVE WORKLOADS AND BANDWIDTH INTENSIVE WORKLOADS

(71) Applicant: Dell Products, L.P., Hopkinton, MA (US)

(72) Inventors: Owen Martin, Hopedale, MA (US); Ramesh Doddaiah, Westborough, MA (US)

(73) Assignee: Dell Products, L.P., Hopkinton, MA (US)

( * ) Notice: Subject to any disclaimer, the term of this patent is extended or adjusted under 35 U.S.C. 154(b) by 45 days.

(21) Appl. No.: 18/181,610

(22) Filed: Mar. 10, 2023

(65) Prior Publication Data
US 2024/0302979 A1    Sep. 12, 2024

(51) Int. Cl.
*G06F 3/00* (2006.01)
*G06F 3/06* (2006.01)

(52) U.S. Cl.
CPC .......... *G06F 3/0634* (2013.01); *G06F 3/0604* (2013.01); *G06F 3/0653* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 5,594,885 A | * | 1/1997 | Lautzenheiser | G06F 11/1435 |
| | | | | 711/E12.04 |
| 11,989,429 B1 | * | 5/2024 | Abrol | G06F 3/067 |
| 2024/0094939 A1 | * | 3/2024 | Pelster | G06F 3/0604 |

* cited by examiner

*Primary Examiner* — Midys Rojas
(74) *Attorney, Agent, or Firm* — Anderson Gorecki LLP

(57) ABSTRACT

A storage system configuration alternation system implements storage system reconfiguration alternation by determining a first set of storage system optimization policies to be applied during periods where the workload on the storage system is primarily transactional, and determining a second set of storage system optimization policies to be applied during periods where the workload on the storage system is primarily bandwidth intensive. The storage system configuration alternation system monitors the storage system workload to identify whether the storage system workload is primarily transactional or primarily bandwidth intensive. Based on the current monitored determination, the configuration alternation system selectively applies either the first or second set of storage system policies. A primarily bandwidth intensive workload may be determined based on a combination of a high percentage read IO operations of maximum read size, low CPU utilization, and high back-end bandwidth utilization. Policies may include CPU bias, memory segmentation, and LRU bias.

20 Claims, 9 Drawing Sheets

IO Size

STORAGE SYSTEM RECONFIGURATION ALTERNATION FOR PROCESSING INTENSIVE WORKLOADS AND BANDWIDTH INTENSIVE WORKLOADS

FIELD

This disclosure relates to computing systems and related devices and methods, and, more particularly, to storage system reconfiguration alternation for processing intensive workloads and bandwidth intensive workloads.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a storage system configuration alternation system implements storage system reconfiguration alternation by determining a first set of storage system optimization policies to be applied during periods where the workload on the storage system is primarily transactional (processing intensive workloads), and determining a second set of storage system optimization policies to be applied during periods where the workload on the storage system is primarily bandwidth intensive, which may be associated, for example, with backup operations. The storage system configuration alternation system monitors the storage system workload to identify whether the storage system workload is primarily transactional or primarily bandwidth intensive. A primarily transactional workload may be characterized by high CPU utilization and host IO read and write operations of variable size, whereas a primarily bandwidth intensive workload may be characterized based on a combination of a high percentage read IO operations of maximum read size, low CPU utilization, and high back-end bandwidth utilization.

Based on the current monitored determination, the configuration alternation system selectively applies either the first or second set of storage system policies. The storage system optimization policies may include multiple policies. As used herein, the term "alternation" is used to refer to the repeated occurrence of two things in turn. In some embodiments, one of the policies that is alternatively applied causes the amount of time data is retained in global memory to be changed. In some embodiments, one of policies that is alternatively applied causes the proportions of global memory that are allocated to the write and read segments to be changed. In some embodiments, one of policies that is alternatively applied causes the size of slots that are implemented in each of the read and write segments of global memory to be changed. In some embodiments, one of policies that is alternatively applied causes the CPU bias to be changed, such that CPU resources are reallocated between front-end process threads and back-end process threads.

In some embodiments, a method of storage system reconfiguration alternation for bandwidth intensive workloads and processing intensive workloads, includes monitoring a workload of a storage system for characteristics indicative of the onset of a primarily bandwidth intensive workload, and determining from the monitored workload whether the workload on the storage system is the primarily bandwidth intensive workload or is not the primarily bandwidth intensive workload. In response to a determination that the workload is not the primarily bandwidth intensive workload, applying a first default set of configuration policies to the storage system to configure the storage system to respond to the primarily processing intensive workload. In response to a determination that the workload is the primarily bandwidth intensive workload, applying a second alternate set of configuration policies to the storage system to reconfigure the storage system to respond to the primarily bandwidth intensive workload.

In some embodiments, the characteristics indicative of the onset of the primarily bandwidth intensive workload include an increase in a proportion of read operations relative to write operations, an increase in a proportion of large sized read operations, a decrease in a CPU utilization of CPU resources of the storage system, and an increase in utilization of a fabric used to access storage resources of the storage system.

In some embodiments, the first default set of configuration policies includes a default Least Recently Used (LRU) policy that specifies a default amount of time data should be retained in shared global memory after receipt of read operations requesting the data. In some embodiments, the second alternate set of configuration policies includes an alternate LRU policy that specifies a second amount of time data should be retained in shared global memory after receipt of read operations requesting the data, the second amount of time being shorter than the default amount of time. In some embodiments, the default amount of time is application specific, such that the default LRU policy separately specifies the default amount of time data should be retained in shared global memory for each individual application. In some embodiments, the second alternate set of configuration policies includes an alternate LRU policy that specifies a second amount of time data should be retained in shared global memory after receipt of read operations requesting the data, the second amount of time is application specific, such that the default LRU policy separately specifies the second amount of time that data should be retained in shared global memory for each individual application, and the second amount of time is shorter than the default amount of time for at least some of the individual applications.

In some embodiments, the first default set of configuration policies includes a default memory segmentation policy, the default memory segmentation policy specifying a default first proportion of shared global memory of the storage system that should be used to implement a mirrored segment of shared global memory, and a default second proportion of shared global shared global memory that should be used to implement an unmirrored segment of shared global memory, and the second alternate set of configuration policies includes an alternate memory segmentation policy, the alternate memory segmentation policy specifying an alternate first proportion of shared global memory of the storage system that should be used to implement the mirrored segment of shared global memory, and an alternate second proportion of shared global shared global memory that should be used to implement the unmirrored segment of shared global memory. In some embodiments, the alternate first proportion of shared global memory is smaller than the default first proportion of shared global memory, and the alternate second proportion of shared global memory is larger than the default second proportion of shared global memory. In some embodiments, the first default set of configuration policies includes a default segment size allocation policy specifying a distribution of slot sizes to be created within each of the mirrored and unmirrored segments of shared global memory, and the second alternate set of configuration policies includes an alternate segment size allocation policy specifying an alternate distribution of slot sizes to be created within each of the mirrored and unmirrored segments of shared global memory. In some embodiments, the alternate distribution of slot sizes to be created within the unmirrored segments of shared global memory specifies a greater proportion of slots of a maximum size to be created with the unmirrored segment of shared global memory.

In some embodiments, monitoring the workload is and determining whether the workload is primarily bandwidth intensive or is not primarily bandwidth intensive is continually implemented, to alternately apply the first default set of configuration policies and the second alternate set of configuration policies to the storage system.

In some embodiments, a system for storage system reconfiguration alternation for bandwidth intensive workloads and processing intensive workloads, includes one or more processors and one or more storage devices storing instructions that are operable, when executed by the one or more processors, to cause the one or more computers processors to perform operations including monitoring a workload of a storage system for characteristics indicative of the onset of a primarily bandwidth intensive workload, and determining from the monitored workload whether the workload on the storage system is the primarily bandwidth intensive workload or is not the primarily bandwidth intensive workload. In response to a determination that the workload is not the primarily bandwidth intensive workload, applying a first default set of configuration policies to the storage system to configure the storage system to respond to the primarily processing intensive workload. In response to a determination that the workload is the primarily bandwidth intensive workload, applying a second alternate set of configuration policies to the storage system to reconfigure the storage system to respond to the primarily bandwidth intensive workload.

In some embodiments, the characteristics indicative of the onset of the primarily bandwidth intensive workload include an increase in a proportion of read operations relative to write operations, an increase in a proportion of large sized read operations, a decrease in a CPU utilization of CPU resources of the storage system, and an increase in utilization of a fabric used to access storage resources of the storage system.

In some embodiments, the first default set of configuration policies includes a default Least Recently Used (LRU) policy that specifies a default amount of time data should be retained in shared global memory after receipt of read operations requesting the data. In some embodiments, the second alternate set of configuration policies includes an alternate LRU policy that specifies a second amount of time data should be retained in shared global memory after receipt of read operations requesting the data, the second amount of time being shorter than the default amount of time. In some embodiments, the default amount of time is application specific, such that the default LRU policy separately specifies the default amount of time data should be retained in shared global memory for each individual application. In some embodiments, the second alternate set of configuration policies includes an alternate LRU policy that specifies a second amount of time data should be retained in shared global memory after receipt of read operations requesting the data, the second amount of time is application specific, such that the default LRU policy separately specifies the second amount of time that data should be retained in shared global memory for each individual application, and the second amount of time is shorter than the default amount of time for at least some of the individual applications.

In some embodiments, the first default set of configuration policies includes a default memory segmentation policy, the default memory segmentation policy specifying a default first proportion of shared global memory of the storage system that should be used to implement a mirrored segment of shared global memory, and a default second proportion of shared global shared global memory that should be used to implement an unmirrored segment of shared global memory, the second alternate set of configuration policies includes an alternate memory segmentation policy, the alternate memory segmentation policy specifying an alternate first proportion of shared global memory of the storage system that should be used to implement the mirrored segment of shared global memory, and an alternate second proportion of shared global shared global memory that should be used to implement the unmirrored segment of shared global memory, and the alternate first proportion of shared global memory is smaller than the default first proportion of shared global memory, and the alternate second proportion of shared global memory is larger than the default second proportion of shared global memory.

In some embodiments, the first default set of configuration policies includes a default segment size allocation policy specifying a distribution of slot sizes to be created within each of the mirrored and unmirrored segments of shared global memory, the second alternate set of configuration policies includes an alternate segment size allocation policy specifying an alternate distribution of slot sizes to be created within each of the mirrored and unmirrored segments of shared global memory, and the alternate distribution of slot sizes to be created within the unmirrored segments of shared global memory specifies a greater proportion of slots of a maximum size to be created with the unmirrored segment of shared global memory.

In some embodiments, monitoring the workload is and determining whether the workload is primarily bandwidth intensive or is not primarily bandwidth intensive is continually implemented, to alternately apply the first default set of configuration policies and the second alternate set of configuration policies to the storage system.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
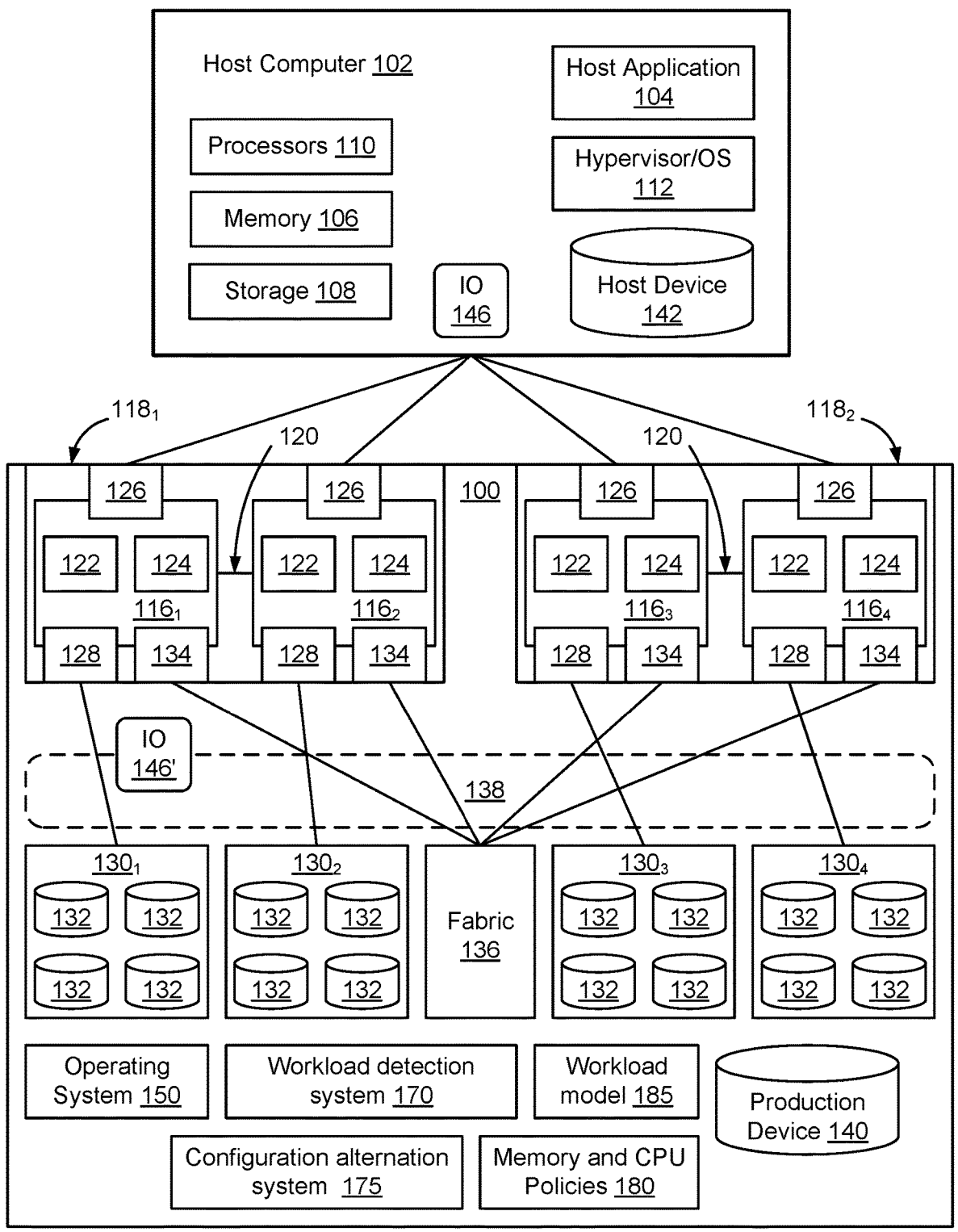
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g., ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g., ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

Enterprise workloads are often a mix of transactional workloads, which tend to be CPU intensive workloads, and sequential workloads which are bandwidth intensive but not CPU intensive. These different types of workloads put different demands on the storage system 100. Different policies can be used to optimize the storage system to handle particular types of workloads, but unfortunately optimizing for both types of workloads can result in compromised performance, both in terms of Response Time (RT) and number of IO Operations Per Second (IOPS) that the storage system is able to process.

According to some embodiments, by modeling workload behavior over time, it is possible to distinguish between periodic bandwidth intensive vs transactional (CPU intensive) workloads. When a large bandwidth intensive time window is detected, such as a window where backup or copy operations are dominating the storage system workload, a service level exclusion window is applied to reconfigure the storage system to an alternate configuration to optimize the storage system for handling a bandwidth intensive workload. In some embodiments, reconfiguration alternation between configurations optimized for processing intensive workloads and bandwidth intensive workloads is implemented automatically, once the storage system workload pattern recognition process has reached a high enough confidence level.

During periods where the workload on the storage system is dominated by transactional IO operations, a first set of global memory and CPU policies 180 are applied to the storage system to optimize the storage system to process the transactional IO operations. During periods where the workload on the storage system is dominated by bandwidth intensive workloads, a second set of global memory and CPU policies 180 are applied to the storage system to optimize the storage system to process the bandwidth intensive IO operations. By implementing storage system reconfiguration alternation for processing intensive workloads and bandwidth intensive workloads, it is possible to optimize the resources of the storage system to improve both response time and number of IO operations per second that the storage system is able to implement for both workload types.

Figure 2:
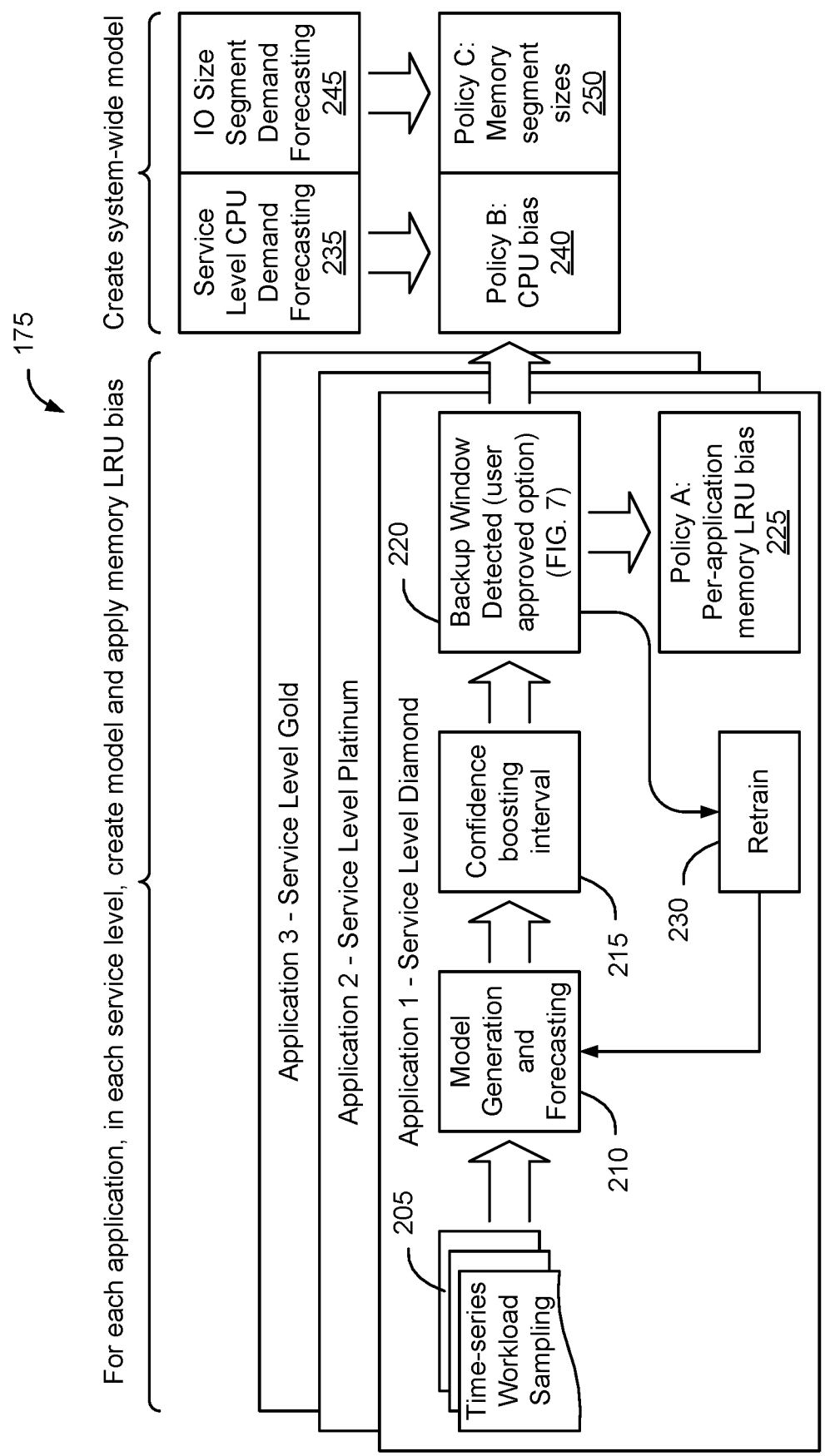
FIG. 2 is a functional block diagram an example storage system configuration alternation system configured to implement storage system reconfiguration alternation for processing intensive workloads and bandwidth intensive workloads, according to some embodiments.

FIG. 2 is a functional block diagram an example storage system configuration alternation system configured to implement storage system reconfiguration alternation for processing intensive workloads and bandwidth intensive workloads, according to some embodiments. As shown in FIG. 2, in some embodiments, for each application in each service level, a model 185 is created and used to apply a global memory bias specifying how long data should be held in global memory for the application. For example, in some embodiments, when a read operation is implemented on a storage volume by a particular application, the requested data is read into global memory from back-end storage resources and retained in global memory until evicted (replaced by other data). By keeping the requested data in global memory for a period of time, if the data is requested a second time before the data is evicted, the storage system will be able to more quickly respond to the second read IO operation, since the storage system will not need to again retrieve the requested data from the back-end storage resources and can simply respond to the read IO operation using the copy of data that is contained in shared global memory.

For example, in some embodiments, use of global memory may be conceptually modeled as implementing a First In First Out (FIFO) queue structure, in which the depth of the queue is adjusted according to the workload characteristics of the particular application. A FIFO queue structure is implemented such that, if the queue is full, the least recently used (LRU) entry is evicted from the queue to make room for the new entry, and the new entry is placed at the head of the queue. By adjusting the depth of the queue, it is possible to keep data in the queue for a longer period of time before the data is evicted from the queue.

When the workload on an application is primarily transactional, the storage system will determine a depth of the queue to be used (LRU depth) on a per-application basis. The particular manner in which the storage system optimizes use of the shared global memory by a set of applications and storage volumes results in creation of a first set of policies that are applied by the storage system to optimize the number of IOs per second (IOPS) and response time (RT) provided by the storage system during the periods of time when the workload is primarily transactional. Many ways of creating this set of policies may be utilized, depending on the implementation, and the invention is not limited to the particular manner in which the policies that are applied by the storage system during the primarily transactional workload period are created.

To enable the storage system configuration alternation system 175 to identify periods when the workload on the storage system is primarily bandwidth intensive, rather than primarily transactional, in some embodiments a time-series workload sampling 205 is created for each application in each service level. The particular time-series workload sampling 205 may be implemented in many ways, and as shown in FIG. 1, may be implemented by a workload detection system 170, for example by using the workload detection system to create a histogram characterizing the workload on the storage system. In some embodiments, IO statistics on a per application basis are collected over a monitoring interval, such as over a several week period. The IO statistics may be aggregated into 4-hour buckets, in which each 4-hour bucket is used to characterize the workload on the application. In some embodiments, the IO statistics include number of read IO operations, number of sequential read IO operations, size of the read IO operations, LRU distance between read IO operations, number of write IO operations, number of sequential write IO operations, the size of the write IO operations, and other features that characteristic the application workload. Other ways of characterizing the IO statistics may be utilized as well, depending on the implementation.

Using the time-series workload sampling 205, a model 185 is generated for the application 210 that can be used to forecast future workloads for the application. In some embodiments, the models are season trend decomposition models that include trend, seasonality, and remainder components that are used, once built, to predict seasonality windows associated with periods of bandwidth intensive workloads. The model is refined over time, referred to herein as a confidence boosting interval 215, and then deployed and used to implement detection of the onset of a period of time dominated by a primarily bandwidth intensive workload 220. For example, in some embodiments the time-series workload sampling aggregates workload statistics over a several week period and uses these statistics to build the model 210. During the confidence boosting interval 215, the model 210 is refined by having the workload detection system 170 continue to implement time-series workload sampling and use the continued time-series workload sampling to adjust the model 210 until the model of the application workload is sufficiently stable to enable the model 210 to be reliably used to predict future workloads 220.

For example, in some instances a particular application will exhibit primarily transaction-based workloads, however during periods where the storage volumes used by the particular application are being backed up, the application workload on those storage volumes may be primarily bandwidth intensive. Because backup operations involve reading the data of the storage volume once and then writing the data to a second storage volume (the backup storage volume), the read operations that occur during the primarily bandwidth intensive periods are unlikely to request the same data twice. Accordingly, by adjusting the LRU policy (Policy A) applied to the shared global memory to reduce the amount of time data is retained in the shared global memory for the application during the period of time when the workload on the storage system is primarily bandwidth intensive, it is possible to free up global memory for use by other applications while the storage volumes used by a particular application are being backed up.

As shown in FIG. 2, in some embodiments the model 210 is used to detect and predict the onset of a time window where the workload on the storage system is primarily bandwidth intensive, for example where the current workload characteristics indicate that backup operations for a particular application are occurring. Optionally, when a backup window is detected, a storage administrator may be notified that the backup window has been detected, and that the LRU policy that is applied to global memory for the particular application will be changed to optimize global memory for the bandwidth intensive workload characteristics. In instances where the storage administrator provides feedback by either approving the model's forecast or denying the model's forecast, the feedback can be used to retrain the model (230) to tweak the model 210 based on the feedback. This reinforcement learning can be used, in some embodiments, to help the model learn workload characteristics for each application that are characteristic of the particular application's bandwidth intensive workload execution periods.

In addition to creating application specific models, and using the application specific models to predict periods of bandwidth intensive workload on a per-application basis, in some embodiments the configuration alternation system 175 also creates system-wide models that are used to characterize overall use of the storage system resources such as use of processing (CPU) resources and global memory.

For example, as shown in FIG. 2, in some embodiments the configuration alternation system 175 monitors CPU usage over time to create a model that is used to forecast CPU demand 235. The configuration alternation system 175 also monitors overall read and write IO size characteristics over time, such as the number of read IOs, the number of write IOs, and the size of the read IOs and write IOs, to create a model that is used to forecast memory segmentation allocation requirements and the size of slots of global memory that should be created within each of the memory segments.

Workloads that are primarily transactional in nature tend to have larger numbers of smaller sized IOs, that are a mixture of read and write IOs. Primarily transactional workloads also tend to consume more CPU resources. By contrast, workloads that are bandwidth intensive tend to have larger numbers of larger sized read IOs, a lower proportion of write IOs, and tend to consume fewer CPU resources. By creating a system-wide model, it is possible to implement service level CPU demand forecasting 235 and IO size segment demand forecasting 245, to create a set of CPU and global memory segmentation policies that are applied during periods where the workload is primarily transactional. Multiple ways of determining the policies that should be applied to the global memory resources during periods where the workload is primarily transactional may be implemented depending on the particular embodiment.

The combination of per-application backup window detection 220, service level demand forecasting 235, and IO size segment demand forecasting 245, enables a first set of system-wide policies to be applied to the storage system resources when the workload is primarily transactional, and enables a second set of system-wide policies to be applied to the storage system during periods of time where the workload on the storage system is predicted to be primarily bandwidth intensive, such as during periods of time when backup operations are occurring. For example, as shown in FIG. 2, in some embodiments the configuration alternation system 175 applies a CPU bias policy 240 (Policy B) to shift more CPU resources to back-end processing during periods of time where the workload is primarily bandwidth intensive. Additionally, as shown in FIG. 2, in some embodiments the configuration alternation system 175 applies a shared global memory policy (Policy C), that changes the sizes of the policy regions of shared global memory. In some embodiments, the shared global memory segmentation policy (Policy C) increases the portion of shared global memory that is allocated to read IO operations (unmirrored policy region) and decreases the portion of shared global memory that is allocated to write IO operations (mirrored policy region) to accommodate the increased proportion of read operations relative to write operations. In some embodiments, the shared global memory policy (Policy C) also includes a slot configuration policy to increase the number of slots of shared global memory within the read policy region that are of the maximum allowable size, to enable additional slots of shared global memory to be available to be utilized to implement the expected increase in large sized read IO operations associated with backup operations.

FIGS. 3-6 are graphs showing hypothetical example workload variations on a storage system over time, according to some embodiments. In particular, FIGS. 3-6 show some examples where it is assumed that the workload on the storage system during weekdays (Monday through Friday) is primarily transactional (primarily processing intensive), and that backup operations occur on the weekends (Saturday and Sunday) which causes the workload on the storage system to be primarily bandwidth intensive during the weekends. It should be understood that backup operations can occur whenever scheduled and can occur on demand, and accordingly the graphs shown in FIGS. 3-6 are intended to show one example scenario where the workload might alternate between being primarily processing intensive and being primarily bandwidth intensive.

Figure 3:
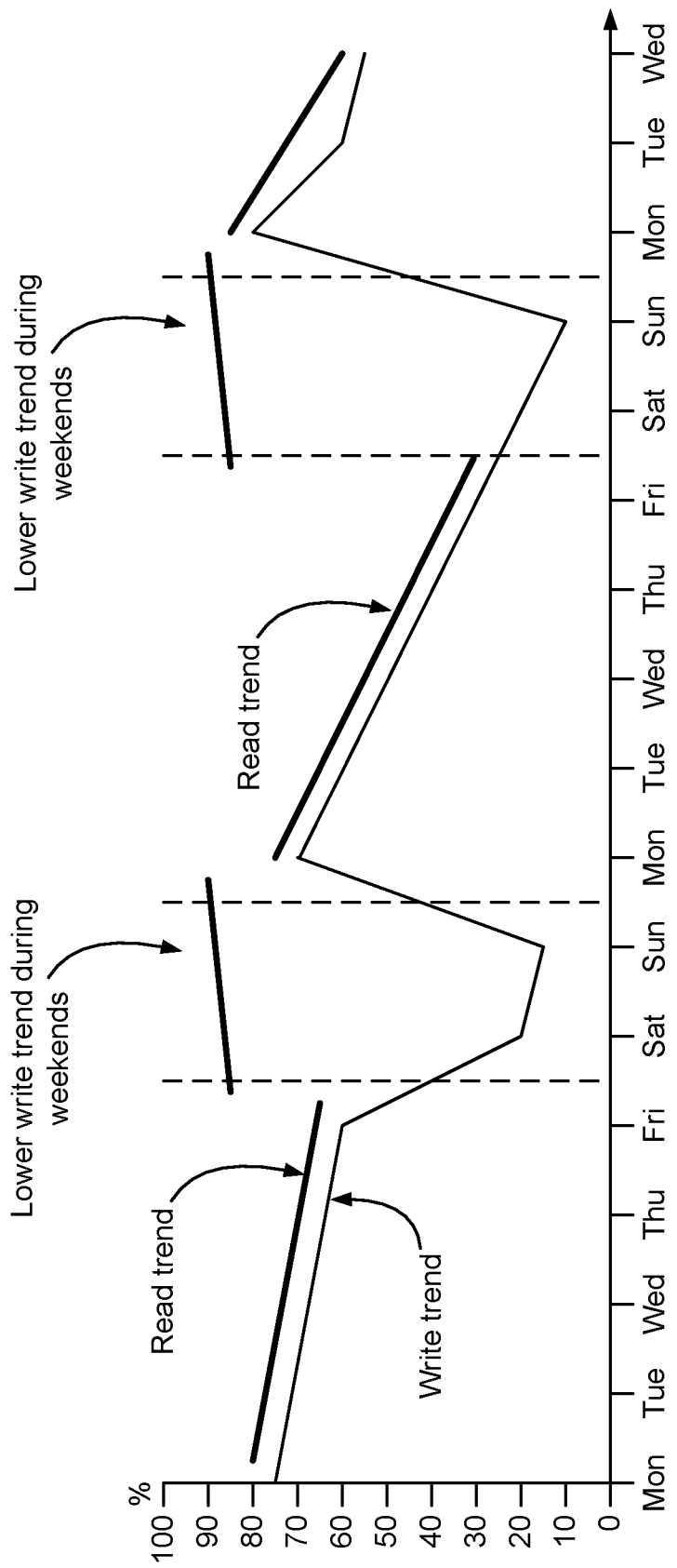
FIG. 3 is graph showing hypothetical example variations in read and write IO operations on a storage system over time, according to some embodiments.

FIG. 3 is graph showing hypothetical example variations in read and write IO operations on a storage system over time, according to some embodiments. In the example shown in FIG. 3, the read and write trends of the IO operations are relatively similar during the weekdays. During weekends, when backup operations are occurring, the number of read operations tends to be relatively high, while the number of write operations drops significantly. Read operations often involve transferring data from back-end storage resources to shared global memory over fabric 136 and, as such, is considered bandwidth intensive, from the perspective of the use of backend resources of the storage system.

Figure 4:
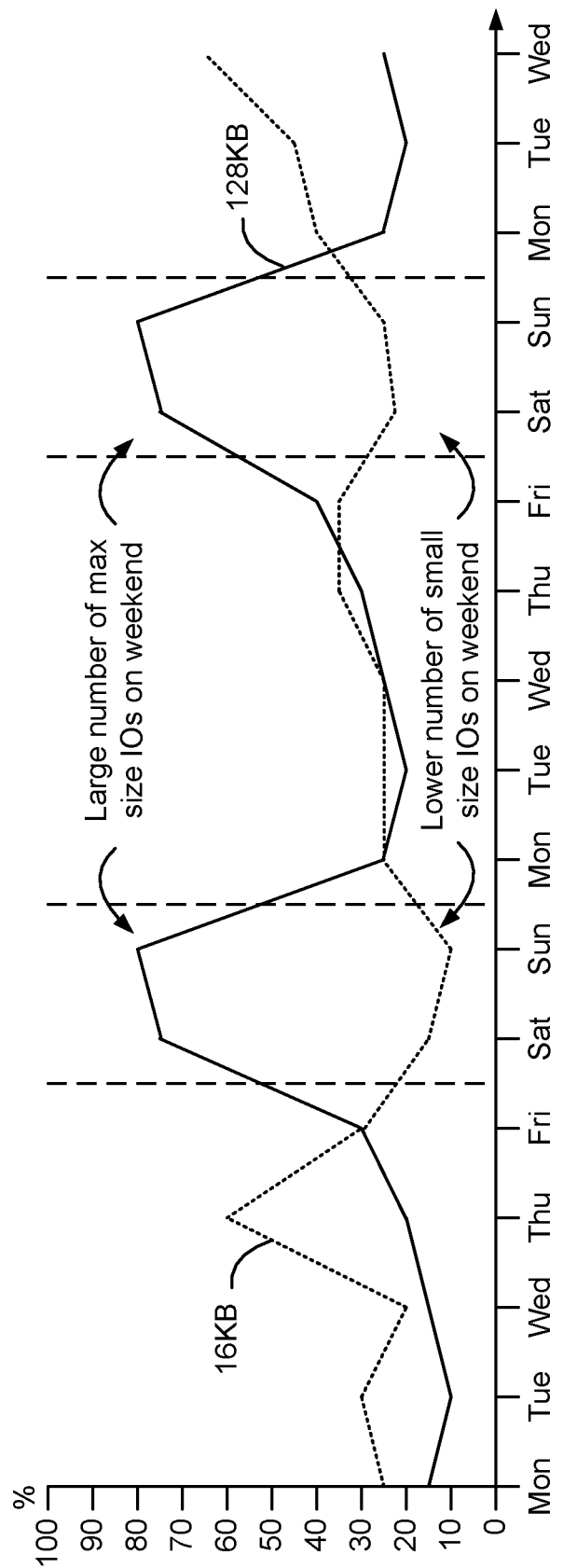
FIG. 4 is graph showing hypothetical example variations in the numbers of read and write IO operations of different sizes on the storage system over time, according to some embodiments.

FIG. 4 is graph showing hypothetical example variations in the numbers of read and write IO operations of different sizes on the storage system over time, according to some embodiments. In particular, FIG. 4 shows the fluctuation of the percentage of IO operations of that have a size of 16 KB (dashed line) and the fluctuation of the percentage of IO operations of that have a size of 128 KB (solid line). As shown in FIG. 4, during the weekdays, during which the workload is primarily transactional, the workload includes a relatively high numberer number of smaller sized IO operations and relatively fewer maximum sized (128 KB) IO operations. By contrast, on weekends, when the workload was dominated by backup operations, the workload includes a large percentage of IO operations of the maximum IO size, and relatively fewer smaller sized IO operations, which is characteristic of a bandwidth intensive workload.

Figure 5:
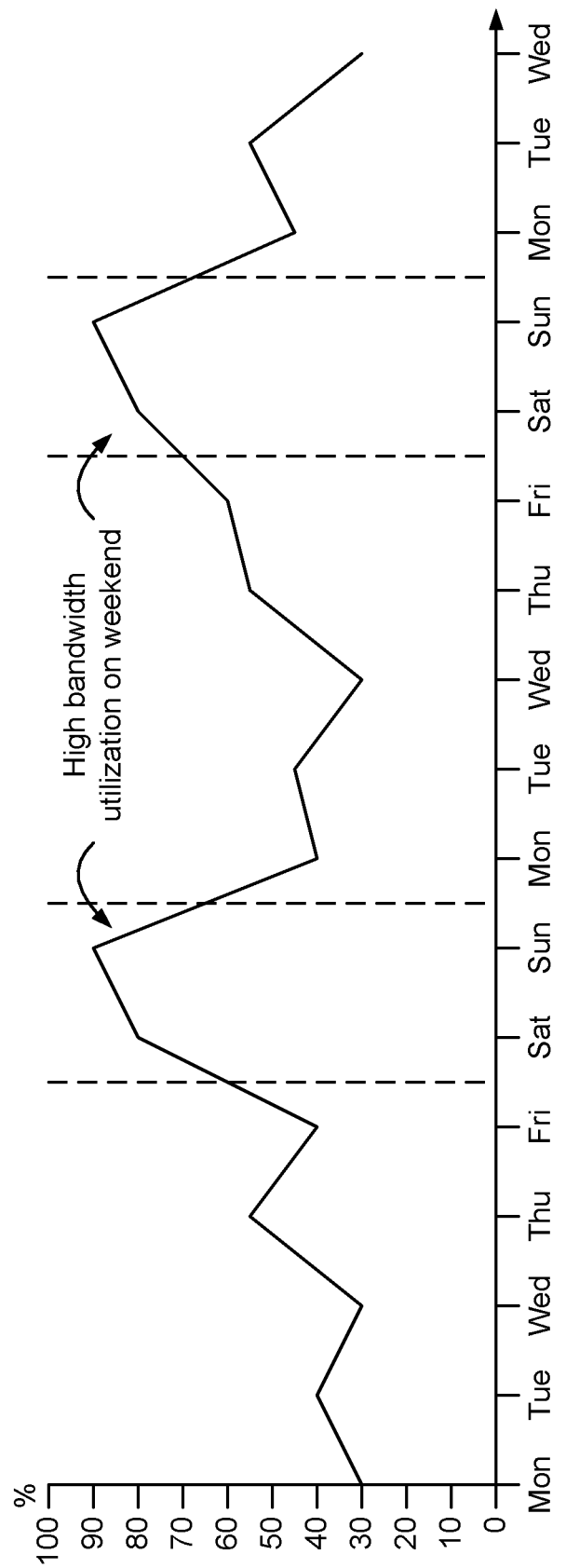
FIG. 5 is graph showing hypothetical example variations of bandwidth utilization over time, according to some embodiments.

FIG. 5 is graph showing hypothetical example variations of bandwidth utilization over time, according to some embodiments. Bandwidth utilization, in some embodiments, refers to the amount (percentage) of back-end capacity of the back-end resources that are being consumed by the workload that is being processed by the storage system. Back-end resources include the resources of the compute nodes, such as the fabric 136, back-end adapters 128, and channel adapters 134, that are used to interconnect the compute nodes 116 and the back-end storage resources 130. Backup operations tend to require the back-end emulation to process a large number of large read operations, to read data stored in the back-end storage resources into global memory, and then read out of shared global memory to a backup storage location. Since these read operations are implemented over the fabric that interconnects the compute nodes and the back-end storage resources, backup operations are considered bandwidth intensive, when viewed from a fabric utilization standpoint. As shown in FIG. 5, in this example backup operations are happening on weekends, and accordingly, the bandwidth utilization on the weekend days is significantly higher than during the weekdays.

Figure 6:
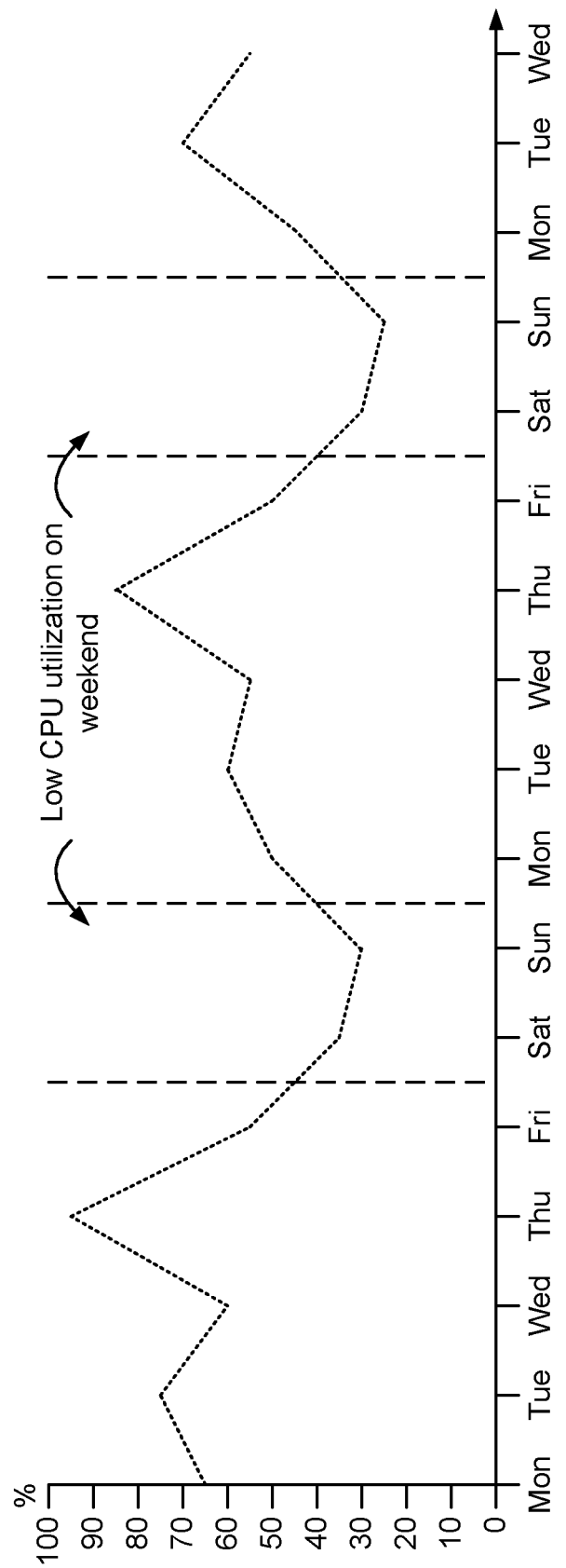
FIG. 6 is graph showing hypothetical example variations of CPU utilization over time, according to some embodiments.

FIG. 6 is graph showing hypothetical example variations of CPU utilization over time, according to some embodiments. As noted above, backup operations frequently involve read operations of relatively large pieces of data. Accordingly, the number of IO operations that the storage system may process per second may be lower than where the relative size of the IO operations is significantly smaller. For example, if a given storage system can process 16,000 KB/second, the storage system would be able to process 1000 IOs having a size of 16 KB, and would be able to process on the order of 125 IOs having a size of 128 KB. Accordingly, workloads characterized by larger IO size can become bandwidth limited, which can limit the number of IO operations implemented by the storage system. Accordingly, primarily bandwidth intensive workloads in some embodiments are characterized by lower overall CPU utilization, as illustrated in FIG. 6.

In some embodiments, the backup window detection process uses a combination of workload characteristics shown in FIGS. 3-6 to detect the occurrence of the onset of window of time during which the workload on the storage system is expected to be a primarily bandwidth intensive workload rather than a primarily transactional workload. Upon detection of occurrence of the onset of a bandwidth intensive workload, the configuration alternation system 175 changes the policies applied to global memory to change the LRU policies for the applications, adjust the global memory segmentation and slot size allocations, and change the CPU bias to redistribute CPU resources within the storage system, to thereby optimize the storage system to provide optimal service for a primarily bandwidth intensive workload during a service level exclusion window. The workload on the storage system is then monitored to determine the end of the primarily bandwidth intensive workload, at which time the configuration alternation system 175 reverts the policies back to the previous policies, to optimize the storage system for processing a primarily transactional workload. By alternating between a first set of policies developed to optimize the storage system to process a primarily transactional workload, and a second set of policies developed to optimize the storage system to process primarily bandwidth intensive workload, it is possible to enable the storage system to be optimized regardless of the type of workload on the storage system.

Figure 7:
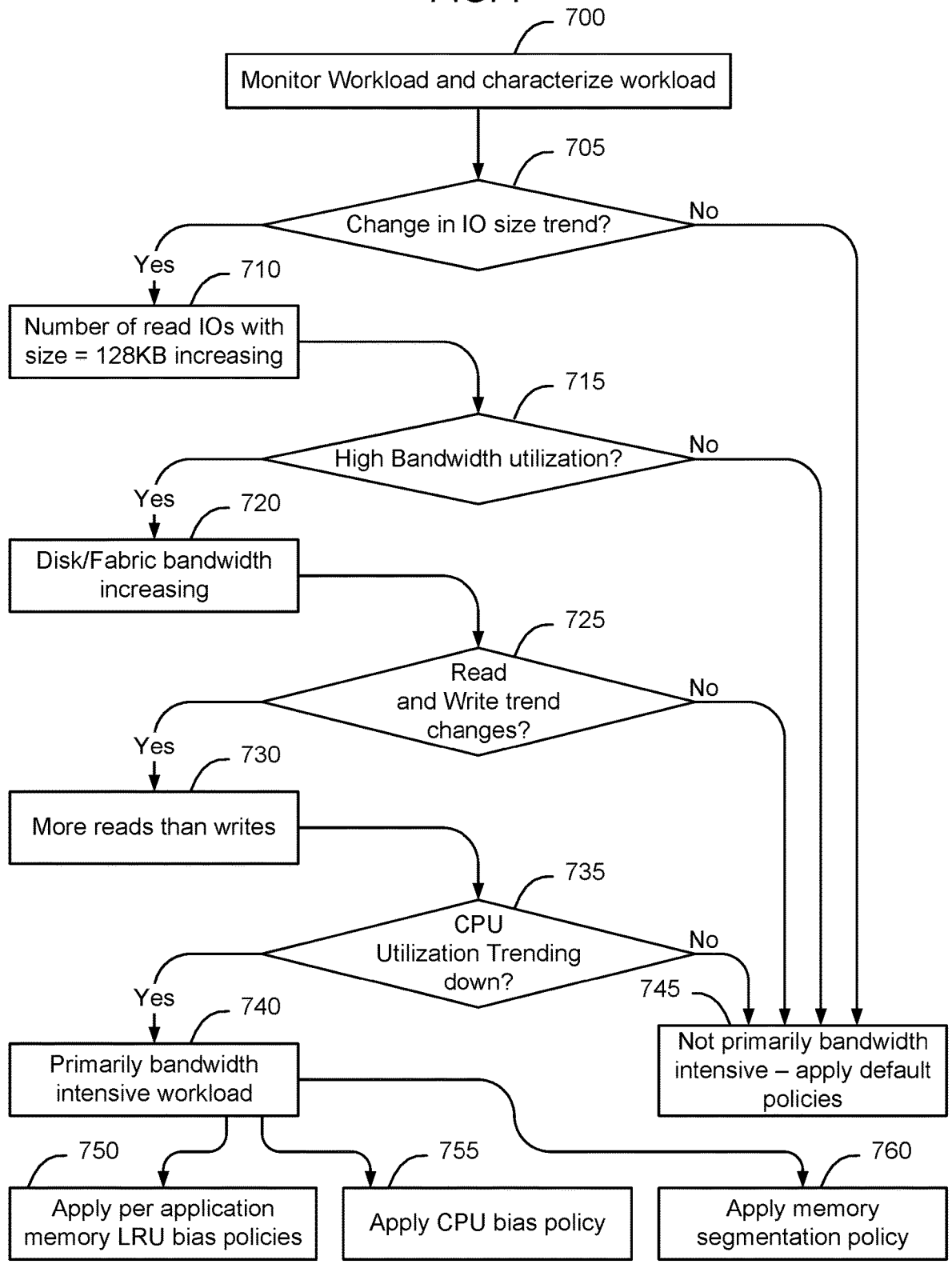
FIG. 7 is flowchart of a method of detecting the onset of a bandwidth intensive workload to cause storage system reconfiguration, according to some embodiments.

FIG. 7 is flowchart of a method of detecting the onset of a bandwidth intensive workload to cause storage system reconfiguration, according to some embodiments. As shown in FIG. 7, in some embodiments the workload detection system 170 monitors and characterizes the workload on the storage system (block 700). The workload characteristics, in some embodiments, include the IO size, the bandwidth utilization of the fabric interconnecting the compute nodes to the backend storage resources, the relative proportion of read operations to write operations, and the amount of storage system CPU utilization. Other workload characteristics may be utilized as well, depending on the implementation.

In some embodiments, the method of detecting the onset of a bandwidth intensive workload to cause storage system reconfiguration includes determining if the workload on the storage system is exhibiting a trend showing that number of IO operations of maximum size is increasing (block 705). In response to a determination that the number of IOs with a maximum size (e.g., 128 KB) is increasing (a determination of YES at block 705), the configuration alternation system 175 determines that it is possible that the workload on the storage system is changing to a primarily bandwidth intensive workload (block 710). In response to a determination that the number of IOs with a maximum size (e.g., 128 KB) is not increasing (a determination of NO at block 705), the configuration alternation system 175 determines that the workload on the storage system is not changing to a primarily bandwidth intensive workload (block 745). During periods where the workload on the storage system is not changing to a primarily bandwidth intensive workload, the configuration alternation system 175 applies a first default set of storage system policies to shared global memory and CPU resources to optimize the storage system to respond to a primarily transactional workload.

In some embodiments, the method of detecting the onset of a bandwidth intensive workload to cause storage system reconfiguration includes determining if the utilization of the fabric interconnecting the compute nodes and back-end storage resources of the storage system is increasing (block 715). In response to a determination that the fabric interconnecting the compute nodes and back-end storage resources of the storage system is exhibiting a period of high bandwidth utilization (a determination of YES at block 715), the configuration alternation system 175 determines that it is possible that the workload on the storage system is changing to a primarily bandwidth intensive workload (block 720). In response to a determination that the fabric interconnecting the compute nodes and back-end storage resources of the storage system is not exhibiting a period of high bandwidth utilization (a determination of NO at block 715), the configuration alternation system 175 determines that the workload on the storage system is not changing to a primarily bandwidth intensive workload (block 745). During periods where the workload on the storage system is not changing to a primarily bandwidth intensive workload, the configuration alternation system 175 applies a first default set of storage system policies to shared global memory and CPU resources to optimize the storage system to respond to a primarily transactional workload.

In some embodiments, the method of detecting the start of a bandwidth intensive workload to cause storage system reconfiguration also includes determining if the percentage of read and write operations is changing (block 725). In response to a determination that the percentage of read operations is increasing relative to the number of write operations (a determination of YES at block 725), the configuration alternation system 175 determines that it is possible that the workload on the storage system is changing to a primarily bandwidth intensive workload (block 730). In response to a determination that the percentage of read operations is not increasing relative to the number of write operations (a determination of NO at block 715), the configuration alternation system 175 determines that the workload on the storage system is not changing to a primarily bandwidth intensive workload (block 745). During periods where the workload on the storage system is not changing to a primarily bandwidth intensive workload, the configuration alternation system 175 applies a first default set of storage system policies to shared global memory and CPU resources to optimize the storage system to respond to a primarily transactional workload. Optionally, in block 725, the number of write operations may be compared with a threshold such that the percent write operations must exceed a threshold more than the percent read operations, before resulting in a determination of YES at block 725.

In some embodiments, the method of detecting the start of a bandwidth intensive workload to cause storage system reconfiguration also includes evaluating the CPU utilization within the storage system (block 735). In response to a determination that the CPU utilization is trending downward (a determination of YES at block 735), the configuration alternation system 175 determines that it is possible that the workload on the storage system is changing to a primarily bandwidth intensive workload (block 740). In response to a determination that CPU utilization is remaining relatively constant or trending upward (a determination of NO at block 735), the configuration alternation system 175 determines that the workload on the storage system is not changing to a primarily bandwidth intensive workload (block 745). During periods where the workload on the storage system is not changing to a primarily bandwidth intensive workload, the configuration alternation system 175 applies a first default set of storage system policies to shared global memory and CPU resources to optimize the storage system to respond to a primarily transactional workload. Optionally, in block 735, the CPU utilization value may be compared with a threshold such that the CPU utilization must be below a threshold percentage utilization value, before resulting in a determination of YES at block 735.

Although FIG. 7 was drawn and described in which the configuration alternation system 175 evaluates particular workload characteristics serially, it should be understood that the configuration alternation system 175 might consider each of the characteristics in parallel. Likewise, the order in which the workload characteristics is considered by the configuration alternation system 175 may vary depending on the implementation, and accordingly blocks 705, 715, 725, and 735 of FIG. 7 may be evaluated by the configuration alternation system 175 in any order, depending on the implementation.

As shown in FIG. 7, in some embodiments the configuration alternation system 175 only results in a determination that the workload on the storage system is actually changing to a primarily bandwidth intensive workload:

In response to a determination that the number of IOs with a maximum size (e.g., 128 KB) is increasing (a determination of YES at block 705);

In response to a determination that the fabric interconnecting the compute nodes and back-end storage resources of the storage system is exhibiting a period of high bandwidth utilization (a determination of YES at block 715);

In response to a determination that the percentage of read operations is increasing relative to the number of write operations (a determination of YES at block 725); and In response to a determination that the CPU utilization is trending downward (a determination of YES at block 735).

In all other instances, (a determination of NO at block 705, 715, 725, or 735), the configuration alternation system 175 determines that the workload on the storage system is not changing to a primarily bandwidth intensive workload (block 745).

In response to a determination that the workload on the storage system is actually changing to a primarily bandwidth intensive workload (a determination of YES at block 705, 715, 725, and 735) (block 740), the configuration alternation system 175 applies an alternate set of policies, different than the first default set of policies, to optimize the storage system to process the primarily bandwidth intensive workload.

In some embodiments, the alternate set of policies applied by the configuration alternation system 175 includes LRU bias policies per application (block 750) to adjust how long data that is read by each of the applications remains in memory before being evicted. This enables different LRU policies to be applied to each of the applications individually. Adjustment of the LRU policy for an application can affect the storage system's overall response time for the application. For example, decreasing the amount of data that is held in shared global memory for a given application can result in fewer read requests being serviced from data that was previously stored in shared global memory, and hence must be first retrieved from back-end storage resources. There may be some applications that are considered mission critical, such that the default LRU policy should always be applied by the storage system to the mission critical applications. There are other applications that might not be considered mission critical, and can tolerate the somewhat longer response time. By applying alternate LRU policies on a per-application basis, it is possible to continue applying the default LRU policies for the mission-critical applications while applying the alternate LRU policies for the other applications. In this manner, certain applications that exhibit continued transactional workloads even during backup periods can continue to function substantially as normal, since the normal LRU policy for the application can be retained during the backup window. Other applications that don't exhibit significant continued transactional workloads during backup periods, by contrast, can have new LRU policies applied to evict data more quickly for those applications from global memory, thus freeing up additional slots of global memory for use by other applications and for use in connection with the backup operations.

In some embodiments, the alternate set of policies applied by the configuration alternation system 175 includes a CPU bias policy (block 755) to preferentially allocate additional CPU resources to threads assigned to process back-end operations. In some embodiments, CPU resources are allocated between a front-end emulation, data services emulation, and back-end emulation. The front-end emulation performs processes associated with receiving IO operations from hosts and responding to IO operations from the hosts. The back-end emulation performs processes associated with servicing host IO operations from back-end storage resources. For example, in some embodiments the back-end emulation is responsible for reading data from back-end storage resources to shared global memory in response to host read IO operations. Once the data is stored in shared global memory, the front-end emulation is responsible for reading the data out from shared global memory to respond to the host IO operation. As another example, in some embodiments the front-end emulation is responsible for writing host IO data to shared global memory in connection with a write IO operation from the host, and the back-end emulation is then responsible for destaging the data from the location in shared global memory to the back-end storage resources. The data services emulation, in some embodiments, is responsible for maintaining metadata associated with managing the data within shared global memory and back-end storage resources and, in some embodiments, can also implement a portion of the operations of the front-end emulation and back-end emulation.

In some embodiments, the CPU bias policy (block 755) that is applied by the configuration alternation system 175 as part of the alternate set of policies is configured to allocate additional CPU resources to threads being utilized to implement the back-end emulation. Additionally, in some embodiments the CPU bias policy is configured to implement other CPU intensive processes, such as disk defragmentation, during workload periods where overall CPU utilization is relatively low. As noted above, during periods where the workload on the storage system is primarily bandwidth intensive, the overall CPU utilization tends to be relatively lower. By scheduling other CPU intensive processes to occur during the period where the workload on the storage system is primarily bandwidth intensive, it is possible to take advantage of the availability of the CPU resources to implement these processor intensive tasks.

In some embodiments, the alternate set of policies applied by the configuration alternation system 175 includes a memory segmentation policy (block 760). In some embodiments, global memory is divided into two segments: a mirrored segment and an unmirrored segment. Within each segment, the memory is divided into slots of different sizes, depending on the expected size of the IO operations that will be handled by each of the memory segments. In some embodiments, the memory segmentation policy (block 760) includes a first policy associated with segmentation size percentages, and a second policy associated with slot size allocation within each segment of memory.

When data is written to the storage system from a host in connection with a host write IO operation, the data that is received from the host does not otherwise exist anywhere else on the storage system. To prevent host data from being lost, in some embodiments any write operation from a host is implemented using slots in a mirrored segment of global memory, such that the host write IO is written to two separate slots of global memory, for example into a separate slot on memory resources of each of two independent compute nodes. Accordingly, in the event of failure of one of the compute nodes, the data will still exist on the other compute node, and hence failure of any one compute node will not result in data unavailability/data loss. Accordingly, in some embodiments the mirrored segment refers to a proportion of shared global memory that is used for write IO operations, in which each time a slot is allocated for a write operation in one portion of memory, a second (mirror) slot is also allocated for the write operation in a second portion of memory.

Host read IO operations, by contrast, are requests for data that is already stored on the storage system, for example in shared global memory or in back-end storage resources. If the data is not in shared global memory, the host data will be read into shared global memory from back-end storage resources 130 before being read out to the host. However, since the host data will continue to be stored in back-end storage resources 130, the host data does not need to be mirrored in shared global memory to protect the data against loss. Accordingly, host read IO operations are able to be implemented using an unmirrored segment of global memory.

As noted above, during backup operations the workload on the storage system tends to exhibit a greater proportion of read IO operations relative to write IO operations. Accordingly, in some embodiments the alternate set of policies includes a memory segmentation policy that is configured to increase the unmirrored segment of shared global memory and to decrease the size of the mirrored segment of shared global memory. This causes a larger percentage of shared global memory to be allocated to the unmirrored segment, which is used to service read operations. Specifically, the memory segmentation policy allocates a greater proportion of shared global memory to be used as the unmirrored segment and reduces the amount of shared global memory that is used to implement the mirrored segment.

In addition, within each segment (unmirrored and mirrored), it is possible to form slots of different sizes. Using different sized slots enables a larger number of slots to be created from a given amount of memory. For example, while it is possible to store a 16 KB piece of data in a 128 KB slot, doing so wastes a considerable amount of memory. If the 128 KB slot is instead divided into 8×16 KB slots, the 16 KB piece of data could be stored in a slot without wasting any space, freeing the remaining 7×16 KB slots to be used for other IO operations.

Accordingly, within each of the segments (mirrored and unmirrored), the slot sizes are adjusted to accommodate expected workload, based on the anticipated sizes of the IO operations. As discussed in greater detail herein, one example cause of occurrence of a primarily bandwidth intensive workload is implementation of backup operations, in which a larger portion of the workload on the storage system includes read operations of maximum size. Accordingly, in some embodiments the alternate set of policies applied by the configuration alternation system 175 includes a memory segmentation policy, for the unmirrored segment of global memory, that increases the proportion of slots of global memory in the unmirrored segment that are the maximum available size, while reducing the proportion of slots of global memory in the unmirrored segment that are smaller than the maximum available size.

Figure 8:
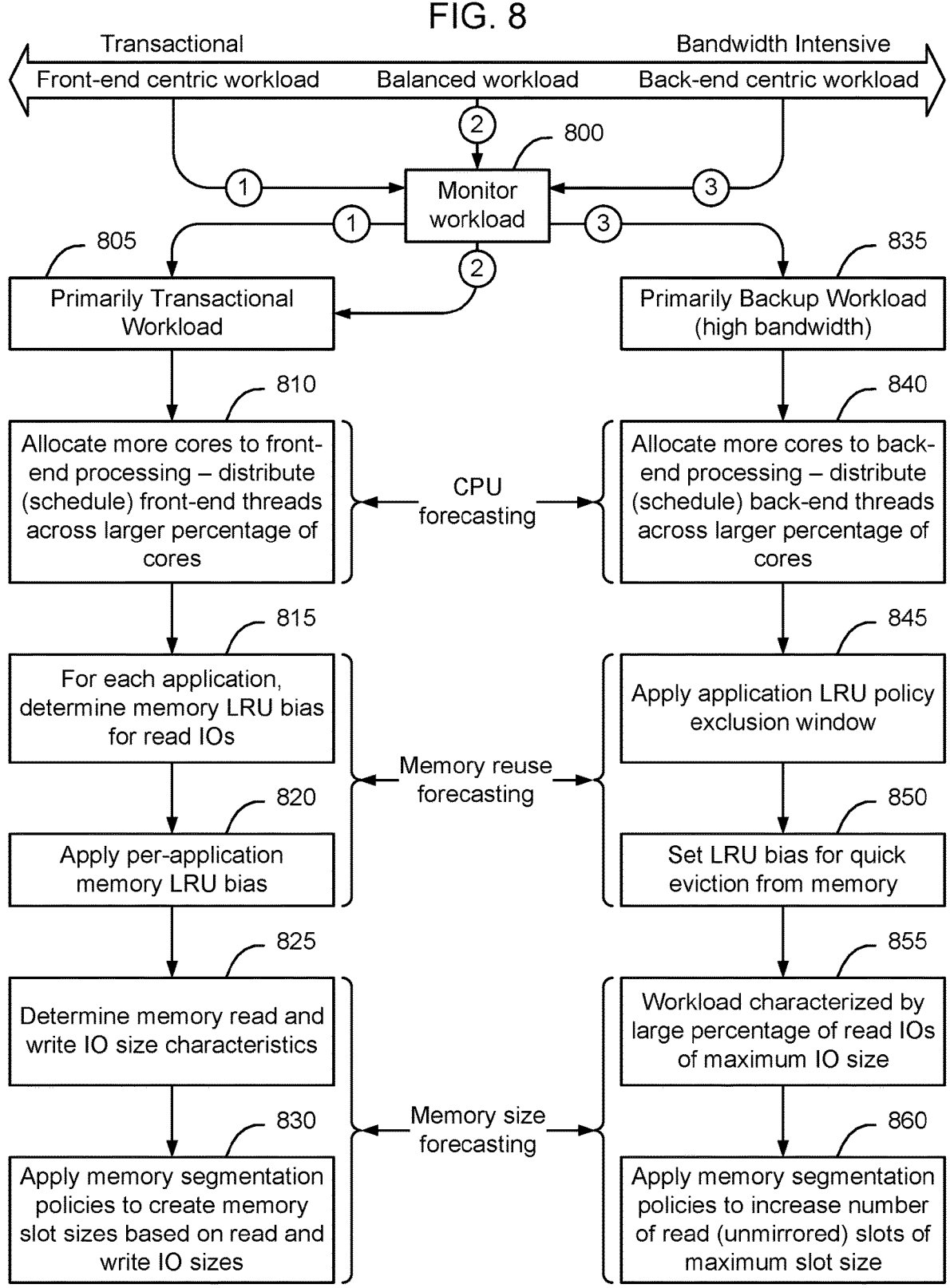
FIG. 8 is a flowchart of a method of storage system configuration alternation between a first configuration optimized processing intensive workloads and a second configuration optimized for processing bandwidth intensive workloads, according to some embodiments.

FIG. 8 is flowchart of a method of storage system configuration alternation between a first configuration optimized for processing intensive workloads and a second configuration optimized for bandwidth intensive workloads, according to some embodiments. As shown in FIG. 8, in some embodiments the workload on a storage system varies from front-end centric workload (arrow 1), typically associated with a transactional workload implemented by applications that tends to be processing intensive, to a back-end centric workload (arrow 3), typically associated with backup operations, that tends to be bandwidth intensive. The workload can also be fairly balanced (arrow 2). As shown in FIG. 8, in some embodiments the workload detection system 170 monitors the workload 800 and in instances where the configuration alternation system 175 determines that the workload on the storage system is either front-end centric (arrow 1) or somewhat balanced (arrow 2), the configuration alternation system 175 applies a first set of default policies configured to optimize the storage system to respond to a primarily transactional workload (block 805). In instances where the configuration alternation system 175 determines that the workload on the storage system is back-end centric, and hence primarily bandwidth intensive (arrow 3), the configuration alternation system 175 applies the alternate set of policies configured to optimize the storage system to implement the primarily bandwidth intensive workload (block 835). By alternating between the two sets of policies, based on the determined workload characteristics, it is possible to implement reconfiguration alternation for both processing intensive workloads and bandwidth intensive workloads, to thus optimize the storage system based on the currently detected and anticipated workload conditions.

In some embodiments, as shown in FIG. 8, the configuration alternation system 175 applies CPU policies, memory reuse (LRU) policies, and memory policies (segmentation allocation and slot size configuration) policies based on whether the workload is determined to be a primarily processor intensive workload (block 805) or a primarily bandwidth intensive workload (block 835).

In some embodiments, the configuration alternation system 175 implements CPU forecasting based on the workload determination (block 805, 835), to preferentially allocate CPU cores to processing threads of either the front-end emulation (block 810) or back-end emulation (block 840). For example, as shown in FIG. 8, in some embodiments if the workload on the storage system is predicted by the configuration alternation system 175 to be primarily transactional, and hence primarily processing intensive, the configuration alternation system 175 allocates more cores to front-end processing such as to front-end emulations. In particular, the configuration alternation system 175 distributes (schedules) the threads that implement the front-end processes across a larger percentage of the CPU cores (block 810) to thereby improve the response time and number of IO operations per second the storage system is able to implement when presented with a primarily transactional workload that tends to be CPU intensive.

By contrast, as shown in FIG. 8, in some embodiments if the workload on the storage system is predicted by the configuration alternation system 175 to be primarily bandwidth intensive, the configuration alternation system 175 allocates more cores to back-end processing. In particular, the configuration alternation system 175 will distribute (schedule) the back-end threads across a larger percentage of the CPU cores (block 810) to thereby improve the number of back-end operations that are able to be executed by the storage system. Further, since a primarily bandwidth intensive workload tends to be less CPU intensive, and the back-end threads are also used to perform particular maintenance operations on the back-end storage resources, such as defragmentation, allocating additional CPU resources to the back-end operations enables those CPU intensive operations to be implemented during periods where the front-end emulation requires fewer CPU processing resources.

In connection with memory reuse forecasting, in some embodiments, the configuration alternation system 175 implements memory reuse forecasting based on the workload determination (block 805, 835), to preferentially set memory reuse policies for each application. For example, as shown in FIG. 8, in some embodiments, for each application, the configuration alternation system 175 determines the memory LRU bias for read IOs (block 815), and applies the per-application memory LRU bias to the memory in connection with read operations by the application (block 820) during periods where the workload on the storage system is determined to be primarily transactional. Since different applications may require previously read data to be retained in the shared global memory for different numbers of transactions to optimize read response by the storage system, enabling per-application memory LRU bias enables these different LRU distances to be set by the configuration alternation system 175 to thus optimize the manner in which the storage system is able to handle IO operations for each of the applications.

By contrast, when the workload is forecast to be primarily bandwidth intensive (block 835), in some embodiments the configuration alternation system 175 applies an application LRU policy exclusion window (block 845). During the LRU policy exclusion window, the normal per-application LRU policy is not applied to all of the applications, and instead a LRU bias configured for quick eviction from global memory is applied to at least some of the applications (block 850). During backup operations, data will often be read once to move the data into shared global memory, written from shared global memory to a backup storage volume (either on the storage system or on a different storage system), and then not subsequently read in connection with the backup operation. Setting the LRU bias for quick eviction (reducing the length of the LRU bias) enables the data that is read during the backup operation to be quickly evicted from shared global memory. This is particularly helpful in instances where the average size of the read IO operations that is occurring is of the maximum data size, which will more quickly fill shared global memory.

In connection with memory size forecasting, in some embodiments, the configuration alternation system 175 implements memory size forecasting based on the workload determination (block 805, 835), to preferentially set memory segmentation sizes of the mirrored segment (used for write IO operations) and unmirrored segment (used for read IO operations) of shared global memory. The configuration alternation system 175 also specifies the distribution of slot sizes within the mirrored segment based on the expected distribution of sizes of write IOs, and sets the distribution of slot sizes within the unmirrored segment based on the expected distribution of sizes of read IOs.

For example, as shown in FIG. 8, in some embodiments the configuration alternation system 175 determines the relative proportion of read and write IOs, as well as the size distribution of read and write IOs from the monitored workload when the workload is primarily transactional (block 805). For example, read and write IO workload on the storage system, as well as the LRU policies, may be used to specifying the proportion of shared global memory that should be used to implement the sizes each of the mirrored and unmirrored segments in connection with the first, default, set of policies. A first histogram of read IO sizes and write IO sizes may also be determined from monitored workload on the storage system (block 825) when the workload is primarily transactional, and used to determine a default distribution of slot sizes within each of the mirrored and unmirrored segments to optimize use of shared global memory when the workload is primarily transactional (block 830).

When the workload is primarily bandwidth intensive, the workload is expected to include a larger percentage of read IOs of the maximum size (block 855). Accordingly, in some embodiments the configuration alternation system 175 applies the alternate second set of memory segmentation policies to allocate a larger percentage of the shared global memory to the unmirrored segment and to allocate a smaller percentage of the shared global memory to the mirrored segment. Additionally, in some embodiments the second alternate set of memory segmentation policies specifies that an increased percentage of slots of the maximum allowable slot size should be created in the unmirrored segment of shared global memory, to accommodate the anticipated large number of read operations of the maximum size characteristic of a primarily bandwidth intensive workload (block 860). In some embodiments, a second histogram of read IO sizes and write IO sizes may also be determined from monitored workload on the storage system when the workload is primarily bandwidth intensive, and used to determine a distribution of slot sizes within each of the mirrored and unmirrored segments to optimize use of shared global memory when the workload is primarily bandwidth intensive (block 860).

Figure 9:
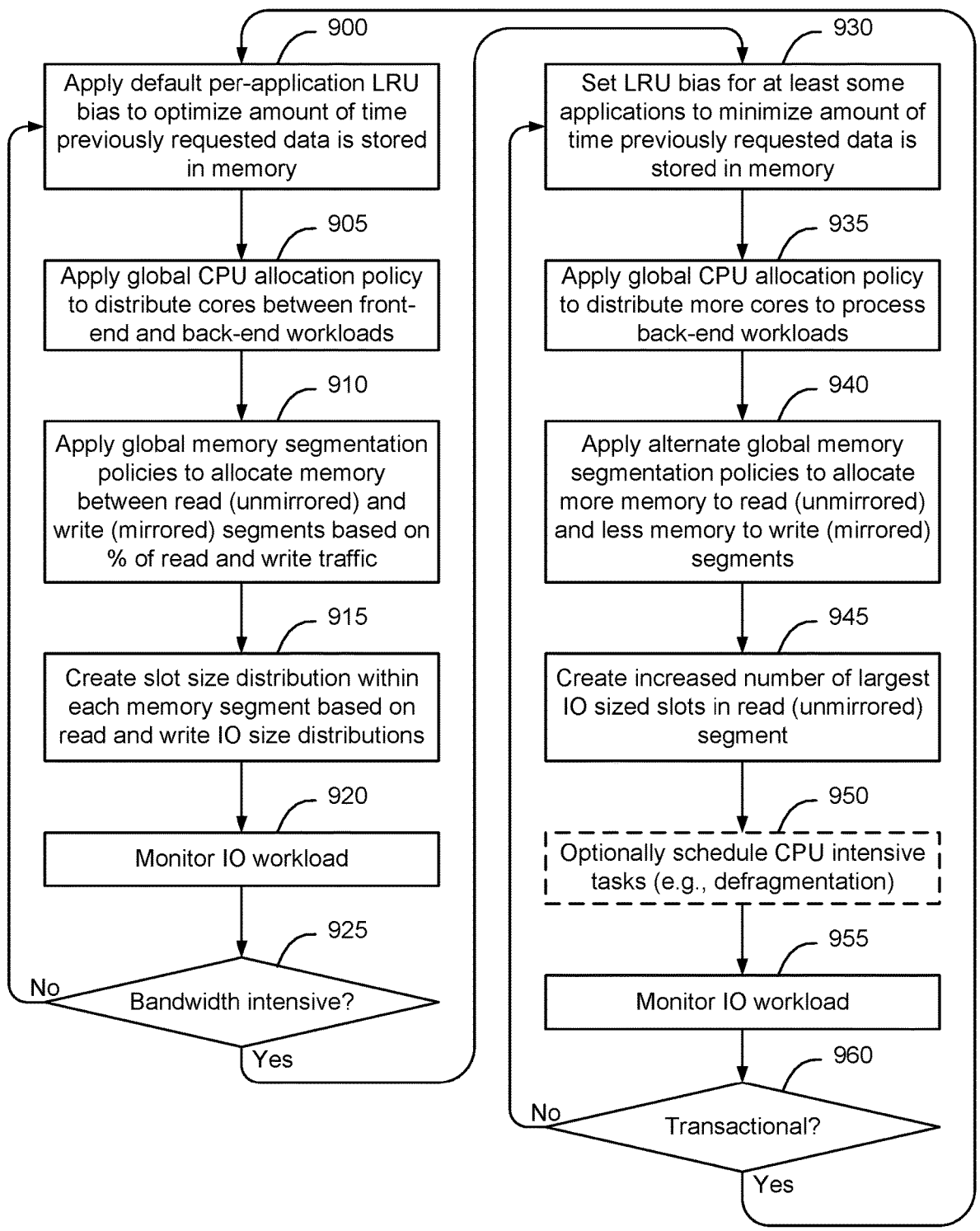
FIG. 9 is flowchart of a method of implementing storage system reconfiguration alternation for processing intensive workloads and bandwidth intensive workloads, according to some embodiments.

FIG. 9 is flowchart of a method of implementing storage system reconfiguration alternation for processing intensive workloads and bandwidth intensive workloads, according to some embodiments. As shown in FIG. 9, in some embodiments storage system reconfiguration alternation involves determining a first set of default storage system optimization policies to be applied during periods where the workload on the storage system is primarily transactional, and determining a second set of alternate storage system optimization policies to be applied during periods where the workload on the storage system is primarily bandwidth intensive. By monitoring the storage system workload, the storage system alternation system 175 identifies whether the storage system workload is primarily transactional or primarily bandwidth intensive, and selectively applies either the first default set of storage system policies or second set of alternate storage system policies accordingly.

As shown in FIG. 9, while the workload on the storage system is primarily transactional (processing intensive), the configuration alternation system 175 applies a first set of default policies including per-application LUR bias policies to optimize the amount of time previously requested data is stored in the shared global memory (block 900). The first set of default policies applied by the configuration alternation system 175 also includes a global CPU allocation policy to distribute cores between the front-end and back-end workloads (block 905). The first set of default policies applied by the configuration alternation system 175 also includes global memory segmentation policies to allocate memory between read (unmirrored) and write (mirrored) segments, for example based on percentages of read and write traffic (block 910). The first set of default policies applied by the configuration alternation system 175 also includes slot size distributions within each segment (unmirrored and mirrored) to specify the slots that should be created within each of the segments (block 915). There are many ways to define the policies applied by the configuration alternation system 175 in blocks 900, 905, 910, and 915, and the invention is not limited to any particular manner in which the first set of default policies are created. Specifically, there are many ways of optimizing a storage system to process primarily transactional workloads, and accordingly the particular first default set of policies will depend on the particular parameters selected to configure the storage system to process IO operations when the workload on the storage system is not primarily bandwidth intensive.

According to some embodiments, the configuration alternation system 175 monitors the workload, identifies a change in workload characteristics to a primarily bandwidth intensive workload, and then automatically adjusts the storage system policies to apply the alternate set of policies to temporarily change the operational parameters of the storage system to optimize configuration of the storage system for the primarily bandwidth intensive workload. After applying the alternate set of policies, the configuration alternation system 175 continues to monitor the workload and, in response to a determination that the bandwidth intensive workload is changing back to a transactional workload, also automatically reverts from the alternate set of policies to the previous default set of policies determined to optimize configuration of the storage system for processing a primarily transactional workload.

Specifically, as shown in FIG. 9, during periods where the workload on the storage system is primarily transactional, the configuration alternation system 175 monitors the IO workload (block 920) to determine if the workload has changed to a primarily bandwidth intensive workload (block 925). Some ways to determine if the workload has changed to a primarily bandwidth intensive workload are described in greater detail in connection with FIG. 7. In response to a determination that the workload has not changed to a primarily bandwidth intensive workload (a determination of NO at block 925), the configuration alternation system 175 continues to apply the default set of policies configured to optimize the storage system to process a primarily transactional workload. In response to a determination that the workload has changed to a primarily bandwidth intensive workload (a determination of YES at block 925), the configuration alternation system 175 applies the alternate second set of policies configured to optimize the storage system to process a primarily bandwidth intensive workload. An example primarily bandwidth intensive workload may be associated with backup operations, although other operations on the storage system may similarly generate primarily bandwidth intensive workloads.

In some embodiments, as shown in FIG. 9, the second alternate set of policies applied by the configuration alternation system 175 include applying a LRU bias policy configured to reduce the amount of time data is maintained in shared global memory before being evicted for at least some of the applications (block 930). In some embodiments, the LRU bias policy applied in block 930 is to not require data to be stored in shared global memory for any period of time before being evicted, thus effectively reducing the LRU policy to a queue of length one (evict after read).

The second alternate set of policies applied by the configuration alternation system 175 also include applying a global CPU allocation policy to distribute more CPU cores to process back-end workloads (block 935). Optionally, CPU intensive processes can also be scheduled to be implemented (block 950).

The second alternate set of policies applied by the configuration alternation system 175 also includes applying a global memory segmentation policies to increase the proportion of shared global memory that is used to implement the unmirrored segment (used for read IO operations) and to reduce the proportion of shared global memory that is used to implement the mirrored segment (used for write IO operations) (block 940). The second alternate set of policies applied by the configuration alternation system 175 also includes creating an increased number of largest sized IO slots in the unmirrored segment of shared global memory (block 945).

During periods where the workload on the storage system is primarily bandwidth intensive, the configuration alternation system 175 applies the second alternate set of policies (blocks 930, 935, 940, 945) and also monitors the IO workload (block 955) to determine if the workload has changed to a primarily transactional workload (block 960). Some ways to determine if the workload has changed to a primarily transactional workload are described in greater detail in connection with FIG. 7. For example, in FIG. 7 if the current workload fails to include one or more characteristics that led to a determination that the workload was primarily bandwidth intensive (block 740), then the workload is primarily transactional (block 745).

In response to a determination that the workload has not changed to a primarily transactional workload (a determination of NO at block 960), the configuration alternation system 175 continues to apply the second alternate set of policies configured to optimize the storage system to process a primarily bandwidth intensive workload. In response to a determination that the workload is no longer a primarily bandwidth intensive workload (a determination of YES at block 960), the configuration alternation system 175 returns to block 900 and applies the first set of policies configured to optimize the storage system to process a primarily transactional workload.

The following table shows an example first default set of policies and example second alternative set of policies to be alternately applied by the configuration alternation system 175 to a storage system 100, in dependence on a determination of whether the current workload is primarily transactional, or whether the workload for an upcoming window of time is expected to be primarily bandwidth intensive:

| Policy | primarily processing intensive (e.g., transactional workload) | primarily bandwidth intensive (e.g., backup workload) |
| --- | --- | --- |
| LRU | Per-application LRU policy based on IO profiles for each application to optimize amount of time host data is retained in shared global memory to optimize read response times for each application | Reduce LRU for at least some applications to minimize amount of time host data is retained in shared global memory to minimize pollution of shared global memory by data that is unlikely to be requested a second time |
| Segmentation | Apply global memory segmentation based on system-wide read and write IO workload | Increase proportion of global memory allocated to unmirrored (read IO operation) to optimize |

| Policy | primarily processing intensive (e.g., transactional workload) | primarily bandwidth intensive (e.g., backup workload) |
|---|---|---|
| | profiles by applications during execution of transactional workload | use of shared global memory for backup operations |
| Slot size | Implement slot size allocation within each segment (mirrored and unmirrored) based on histogram of system-wide read and write IO workload profiles by applications during execution of transactional workload | Increase proportion of slots within unmirrored segment of global memory that are configured to have a maximum IO slot size. Optionally based on second histogram of system-wide read and write IO workload profiles by applications during execution of bandwidth intensive workload |
| CPU bias | Bias CPU utilization toward front-end to schedule threads of front-end emulation over larger number of CPU cores to optimize storage system IOPS and RT | Bias CPU utilization toward back-end to schedule threads of back-end emulation over larger number of CPU cores; optionally schedule back-end emulation tasks that are CPU intensive to execute using the enhanced CPU allocation |

By providing a configuration alternation system 175 that is configured to alternate between applying two sets of policies to the storage system, depending on whether the workload on the storage system is primarily a processing intensive workload or primarily a bandwidth intensive workload, it is possible to reduce pollution of global memory during the bandwidth intensive workload periods, and also alternately optimize the configuration of the global memory for the different workload characteristics. It is also possible to provide a self-tuning CPU to distribute cores between threads, or distribute threads between cores, according to whether the upcoming period is expected to be primarily transactional or bandwidth intensive. This combination of policy changes enables the storage system to be configured at the global level to address system level optimization, in response to a forecasting system that is used to predict the onset of periods where the workload on the storage system is expected to change from primarily transactional to primarily bandwidth intensive.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of storage system reconfiguration alternation for bandwidth intensive Input/Output command (IO) workloads and processing intensive IO workloads, comprising:
monitoring an IO workload of a storage system for characteristics indicative of the onset of a primarily bandwidth intensive IO workload;
determining from the monitored IO workload whether the IO workload on the storage system is the primarily bandwidth intensive IO workload or is not the primarily bandwidth intensive IO workload;
in response to a determination that the IO workload is not the primarily bandwidth intensive IO workload, applying a first default set of configuration policies to the storage system to configure the storage system to respond to the primarily processing intensive IO workload; and in response to a determination that the IO workload is the primarily bandwidth intensive IO workload, applying a second alternate set of configuration policies to the storage system to reconfigure the storage system to respond to the primarily bandwidth intensive IO workload;

wherein the first default set of configuration policies includes a default Least Recently Used (LRU) policy that specifies a default amount of time data should be retained in shared global memory after receipt of read IO operations requesting the data;

wherein the default amount of time is application specific, such that the default LRU policy separately specifies the default amount of time data should be retained in shared global memory for each individual application;

wherein the second alternate set of configuration policies includes an alternate LRU policy that specifies a second amount of time data should be retained in shared global memory after receipt of read IO operations requesting the data;

wherein the second amount of time is application specific, such that the default LRU policy separately specifies the second amount of time that data should be retained in shared global memory for each individual application; and wherein the second amount of time is shorter than the default amount of time for at least some of the individual applications.

2. The method of claim 1, wherein the characteristics indicative of the onset of the primarily bandwidth intensive IO workload include:

an increase in a proportion of read IO operations relative to write IO operations;

an increase in a proportion of large sized read IO operations;

a decrease in a CPU utilization of CPU resources of the storage system; and an increase in utilization of a fabric used to access storage resources of the storage system.

3. The method of claim 1, wherein monitoring the IO workload and determining whether the IO workload is primarily bandwidth intensive or is not primarily bandwidth intensive is continually implemented, to alternately apply the first default set of configuration policies and the second alternate set of configuration policies to the storage system.

4. A method of storage system reconfiguration alternation for bandwidth intensive Input/Output command (IO) workloads and processing intensive IO workloads, comprising:

monitoring an IO workload of a storage system for characteristics indicative of the onset of a primarily bandwidth intensive IO workload;

determining from the monitored IO workload whether the IO workload on the storage system is the primarily bandwidth intensive IO workload or is not the primarily bandwidth intensive IO workload;

in response to a determination that the IO workload is not the primarily bandwidth intensive IO workload, applying a first default set of configuration policies to the storage system to configure the storage system to respond to the primarily processing intensive IO workload; and in response to a determination that the IO workload is the primarily bandwidth intensive IO workload, applying a second alternate set of configuration policies to the storage system to reconfigure the storage system to respond to the primarily bandwidth intensive IO workload;

wherein the first default set of configuration policies includes a default memory segmentation policy, the default memory segmentation policy specifying a default first proportion of shared global memory of the storage system that should be used to implement a mirrored segment of shared global memory, and a default second proportion of shared global shared global memory that should be used to implement an unmirrored segment of shared global memory; and wherein the second alternate set of configuration policies includes an alternate memory segmentation policy, the alternate memory segmentation policy specifying an alternate first proportion of shared global memory of the storage system that should be used to implement the mirrored segment of shared global memory, and an alternate second proportion of shared global shared global memory that should be used to implement the unmirrored segment of shared global memory.

5. The method of claim 4, wherein the alternate first proportion of shared global memory is smaller than the default first proportion of shared global memory, and wherein the alternate second proportion of shared global memory is larger than the default second proportion of shared global memory.

6. The method of claim 4, wherein the first default set of configuration policies includes a default segment size allocation policy specifying a distribution of slot sizes to be created within each of the mirrored and unmirrored segments of shared global memory; and wherein the second alternate set of configuration policies includes an alternate segment size allocation policy specifying an alternate distribution of slot sizes to be created within each of the mirrored and unmirrored segments of shared global memory.

7. The method of claim 6, wherein the alternate distribution of slot sizes to be created within the unmirrored segments of shared global memory specifies a greater proportion of slots of a maximum size to be created with the unmirrored segment of shared global memory.

8. The method of claim 4, wherein the first default set of configuration policies includes a default Least Recently Used (LRU) policy that specifies a default amount of time data should be retained in shared global memory after receipt of read IO operations requesting the data.

9. The method of claim 8, wherein the second alternate set of configuration policies includes an alternate LRU policy that specifies a second amount of time data should be retained in shared global memory after receipt of read IO operations requesting the data, the second amount of time being shorter than the default amount of time.

10. The method of claim 8, wherein the default amount of time is application specific, such that the default LRU policy separately specifies the default amount of time data should be retained in shared global memory for each individual application.

11. The method of claim 10, wherein the second alternate set of configuration policies includes an alternate LRU policy that specifies a second amount of time data should be retained in shared global memory after receipt of read IO operations requesting the data;

wherein the second amount of time is application specific, such that the default LRU policy separately specifies the second amount of time that data should be retained in shared global memory for each individual application; and wherein the second amount of time is shorter than the default amount of time for at least some of the individual applications.

12. The method of claim 4, wherein monitoring the IO workload and determining whether the IO workload is primarily bandwidth intensive or is not primarily bandwidth intensive is continually implemented, to alternately apply the first default set of configuration policies and the second alternate set of configuration policies to the storage system.

13. A system for storage system reconfiguration alternation for bandwidth intensive Input/Output command (IO) workloads and processing intensive IO workloads, comprising:

one or more processors and one or more storage devices storing instructions that are operable, when executed by the one or more processors, to cause the one or more computers processors to perform operations comprising:

monitoring a IO workload of a storage system for characteristics indicative of the onset of a primarily bandwidth intensive IO workload;

determining from the monitored IO workload whether the IO workload on the storage system is the primarily bandwidth intensive IO workload or is not the primarily bandwidth intensive IO workload;

in response to a determination that the IO workload is not the primarily bandwidth intensive IO workload, applying a first default set of configuration policies to the storage system to configure the storage system to respond to the primarily processing intensive IO workload; and in response to a determination that the IO workload is the primarily bandwidth intensive IO workload, applying a second alternate set of configuration policies to the storage system to reconfigure the storage system to respond to the primarily bandwidth intensive IO workload;

wherein the first default set of configuration policies includes a default memory segmentation policy, the default memory segmentation policy specifying a default first proportion of shared global memory of the storage system that should be used to implement a mirrored segment of shared global memory, and a default second proportion of shared global shared global memory that should be used to implement an unmirrored segment of shared global memory;

wherein the second alternate set of configuration policies includes an alternate memory segmentation policy, the alternate memory segmentation policy specifying an alternate first proportion of shared global memory of the storage system that should be used to implement the mirrored segment of shared global memory, and an alternate second proportion of shared global shared global memory that should be used to implement the unmirrored segment of shared global memory; and wherein the alternate first proportion of shared global memory is smaller than the default first proportion of shared global memory, and wherein the alternate second proportion of shared global memory is larger than the default second proportion of shared global memory.

14. The system of claim 13, wherein the characteristics indicative of the onset of the primarily bandwidth intensive IO workload include:

an increase in a proportion of read IO operations relative to write IO operations;

an increase in a proportion of large sized read IO operations;

a decrease in a CPU utilization of CPU resources of the storage system; and an increase in utilization of a fabric used to access storage resources of the storage system.

15. The system of claim 13, wherein the first default set of configuration policies includes a default Least Recently Used (LRU) policy that specifies a default amount of time data should be retained in shared global memory after receipt of read IO operations requesting the data.

16. The system of claim 15, wherein the second alternate set of configuration policies includes an alternate LRU policy that specifies a second amount of time data should be retained in shared global memory after receipt of read IO operations requesting the data, the second amount of time being shorter than the default amount of time.

17. The system of claim 15, wherein the default amount of time is application specific, such that the default LRU policy separately specifies the default amount of time data should be retained in shared global memory for each individual application.

18. The system of claim 17, wherein the second alternate set of configuration policies includes an alternate LRU policy that specifies a second amount of time data should be retained in shared global memory after receipt of read IO operations requesting the data;

wherein the second amount of time is application specific, such that the default LRU policy separately specifies the second amount of time that data should be retained in shared global memory for each individual application; and wherein the second amount of time is shorter than the default amount of time for at least some of the individual applications.

19. The system of claim 13, wherein the first default set of configuration policies includes a default segment size allocation policy specifying a distribution of slot sizes to be created within each of the mirrored and unmirrored segments of shared global memory;

wherein the second alternate set of configuration policies includes an alternate segment size allocation policy specifying an alternate distribution of slot sizes to be created within each of the mirrored and unmirrored segments of shared global memory; and wherein the alternate distribution of slot sizes to be created within the unmirrored segments of shared global memory specifies a greater proportion of slots of a maximum size to be created with the unmirrored segment of shared global memory.

20. The system of claim 13, wherein monitoring the IO workload and determining whether the IO workload is primarily bandwidth intensive or is not primarily bandwidth intensive is continually implemented, to alternately apply the first default set of configuration policies and the second alternate set of configuration policies to the storage system.

* * * * *